United States Patent [19]

Haynes

[11] Patent Number: 4,757,710
[45] Date of Patent: Jul. 19, 1988

[54] SIGHT GLASS FOR OBSERVING LUBRICANT IN THE LOWER GEARCASE OF MARINE ENGINES

[76] Inventor: James B. Haynes, 5 Ridge Dr., Naples, Fla. 33963

[21] Appl. No.: 144,329

[22] Filed: Jan. 15, 1988

[51] Int. Cl.⁴ .............................................. G01F 23/02
[52] U.S. Cl. ....................................... 73/334; 73/328; 116/276; 220/82 A; 441/135
[58] Field of Search .................. 73/323, 334; 116/276; 441/135; 220/82 A

[56] References Cited

U.S. PATENT DOCUMENTS

| | | | |
|---|---|---|---|
| 1,068,626 | 7/1913 | Buck . | |
| 2,765,661 | 10/1956 | Thomas . | |
| 3,000,345 | 9/1961 | Gray, Jr. et al. | 73/323 X |
| 3,020,795 | 2/1962 | McKinney . | |
| 3,142,287 | 7/1964 | Jones | 116/276 X |
| 3,556,038 | 1/1971 | Wolfe | 220/82 A |
| 4,037,471 | 7/1977 | Okamoto et al. | 73/118 X |
| 4,590,798 | 5/1986 | Yazaki . | |

Primary Examiner—Daniel M. Yasich
Attorney, Agent, or Firm—Merrill N. Johnson

[57] ABSTRACT

A sight glass assembly for observing the lubricant in the lower gearcase of a marine engine. The assembly is designed to be bonded into a circular hole in the lower gearcase housing and includes a window retaining ring which is bonded to the gearcase housing and a lock ring located inside the gearcase, an annular O-ring of resilient water proof material fitted into an annular groove in the retaining ring, a cylindrical disc-shaped transparent sight glass one of whose two outer edges is pressed against the O-ring, and a window cover having a central void and an annular face which is pressed against the second outer edge of the sight glass. The window cover is threadedly joined to the window retaining ring and is preferably locked into place by a lock screw threaded into a hole in the adjoining edges of the window retaining ring and the window cover.

4 Claims, 1 Drawing Sheet

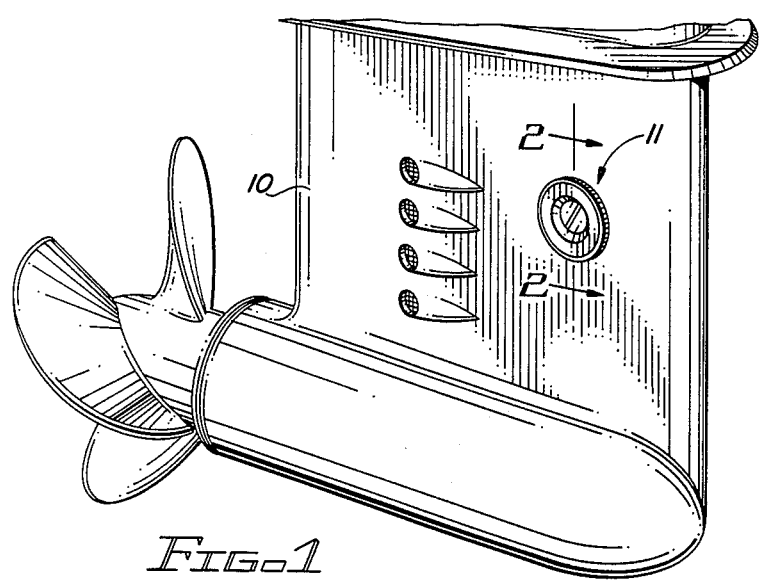
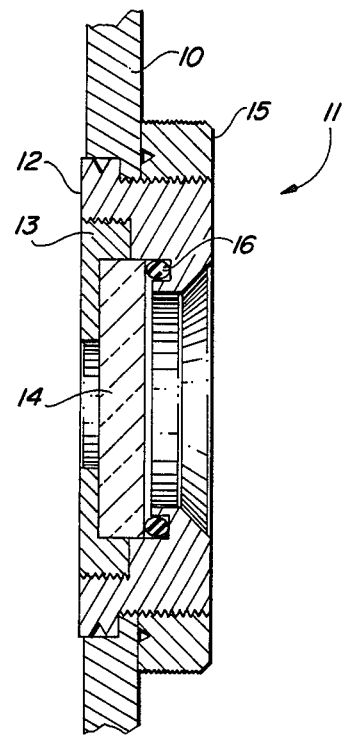
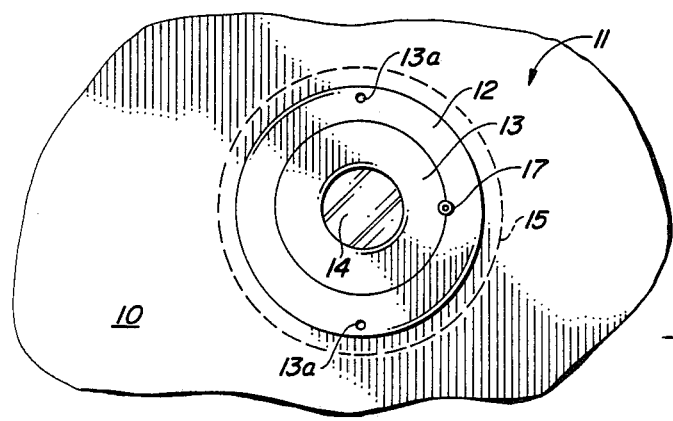
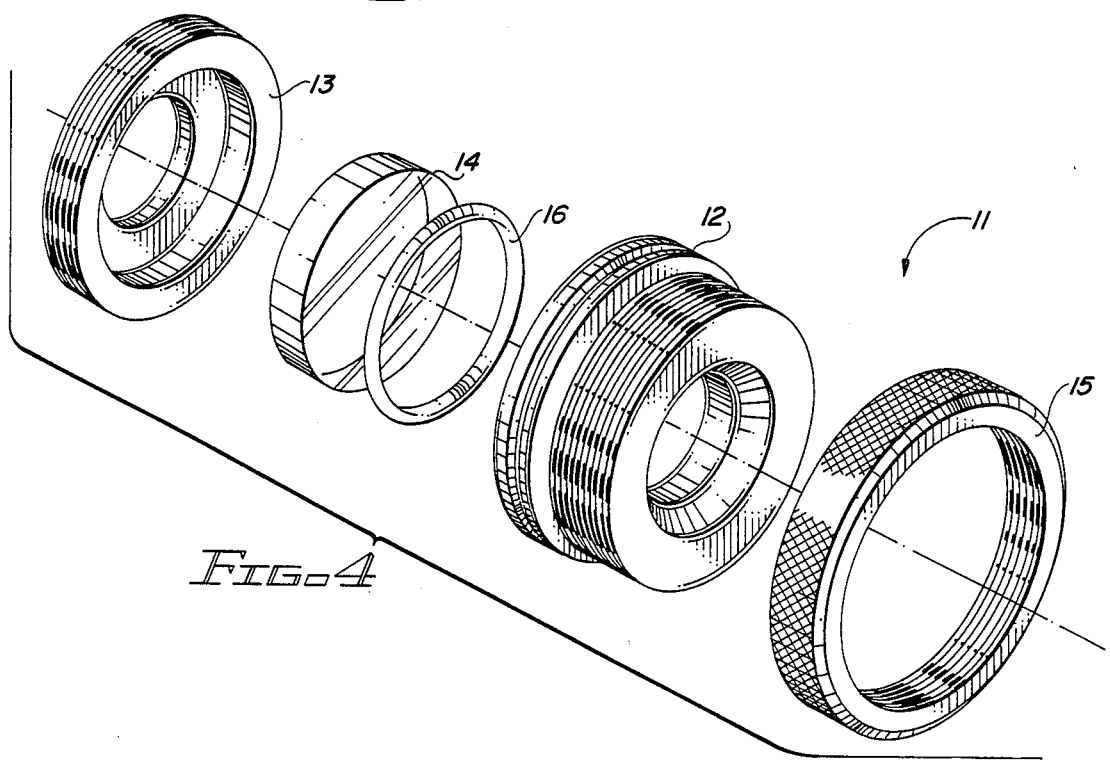

SIGHT GLASS FOR OBSERVING LUBRICANT IN THE LOWER GEARCASE OF MARINE ENGINES

BACKGROUND AND SUMMARY OF THE INVENTION

My invention relates to marine engines and particularly to inboard and outboard engines having a lower gearcase which normally operates partially submerged in water.

A major source of trouble occuring with such marine engines is the entry of water into the lower gearcase, especially when the engines are operated in salt water. Water leaking into the gearcase mixes with the liquid lubricant within the gearcase and drastically reduces the lubricant's effectiveness. The water also tends to pit the surfaces of the moving metal parts of the power train and these effects eventually cause failure of the power train and costly repair and replacement of damaged parts.

Up to now the only way to guard against damages caused by the entry of water into the lower gearcase of marine engines has been to periodically take the marine engine out of the water, drain the lubricant and thus determine whether or not the lubricant has been contaminated with water. Such procedure conventionally recommended by the manufacturers of most marine engines, is both costly and time consuming. To take a medium sized sport fishing boat out of the water and check the condition of its outboard marine engine, most marinas charge in excess of $100 plus the cost of materials and supplies used.

My invention provides a sight glass or window in the side of the lower gearcase of the marine engine. The presence of even a few cubic centimeters of water mixed into the conventional liquid lubricant contained within the lower gearcase of a small outboard engine will turn the lubricant from its normally dark brown color to a milky-off white.

Thus by use of my invention the boat's owner or operator can look into the sight glass in the side of the gearcase and immediately determine by observing the color of the lubricant within the gearcase whether or not water has leaked into the lower gearcase. My sight glass permits frequent inspection of the interior of the gearcase without cost or removal of the boat from the water. It also permits prompt corrective action to be taken in the event water has entered the gearcase, thus saving expensive repairs or replacement which would have resulted if the water had remained in the gearcase for an extended period of time.

My invention can be installed by the manufacturer of the marine engine or it may be installed by others onto an existing engine which has no sight glass. In the case of an engine manufacturer, I recommend that the lower gearcase housing be cast with a circular hold having a thickness somewhat greater than the usual thickness of the housing in the side of the casing. The outer edge of this hole can then be threaded to accept the window retaining ring of my sight glass assembly.

In the case of marine engine which has no sight glass, it is first necessary to cut a flanged circular hole in the side of the gearcase and to place an internally threaded lock ring inside the gearcase surrounding the cut hole to receive the retaining ring of the sight glass assembly.

My sight glass assembly includes a window retaining ring which is threadedly mounted into the flanged circular hole in the gearcase housing and bonded to the hole preferably by a suitable quick setting epoxy glue to insure a waterproof connection. The window retaining ring contains a axially concentric groove into which is fitted an O-ring of resilient waterproof material. Then a preferably flat circular transparent sight glass is pressed against the O-ring and firmly locked into waterproof connection with the O-ring by a window cover having a central void and an annular flat face which is pressed against the outer edge of the sight glass opposite to the outer edge of the sight glass which is pressed against the O-ring.

The window cover is threadedly joined to the retaining ring and is preferably locked into place by a lock screw threaded into a hole located in the adjoining outer edges of the window retaining ring and the window cover.

I have found that the foregoing sight glass assembly properly installed is absolutely waterproof and tests conducted over several months have resulted in no leakage of water into the engine's gearcase. My sight glass assembly can be installed either by the engine manufacturer or by others on an existing marine engine at a modest cost as compared with the usual cost of a single conventional checking of the condition of the interior of the marine engine's lower gear case which involves taking the boat out of the water and opening up the gearcase to permit visual inspection of the gearcase's lubricant.

BRIEF DESCRIPTION OF THE DRAWING

In the drawing:

FIG. 1 is a perspective view partially broken away showing the mounting of my sight glass assembly onto the lower gearcase of an outboard marine engine;

FIG. 2 is a cross-sectional side view of the sight glass assembly taken along line 2—2 of FIG. 1;

FIG. 3 is a detailed front view of the sight glass assembly shown in FIG. 1; and FIG. 4 is an exploded view showing in greater detail the component parts of the sight glass assembly shown in FIGS. 1, 2 and 3.

DETAILED DESCRIPTION OF A PREFERRED EMBODIMENT OF THE INVENTION

Referring to the attached drawing, FIG. 1 shows a preferred embodiment of my sight glass assembly 11 mounted on the side of the lower gearcase 10 of an outboard marine engine.

The component parts of assembly 11 are best shown in FIGS. 2, 3, and 4. Gearcase housing 10 is an aluminum casting with an average wall thickness of 0.130 inches into which a flanged circular hole has been cut having a diameter of 1.5 inches measured across the flange. The recess in front of the flange has a diameter of 1.625 inches and is 0.075 inches deep.

Window retaining ring 12 is preferably made of aluminum with a front flange sized to fit into the recess in gearcase housing 10 and is externally threaded to be screwed into the internal threads of lock ring 15 which is located inside gearcase 10 surrounding the hole in the gearcase. The threaded portion of window retaining ring 12 has a diameter of just under 1.5 inches.

In order to securely bond window retaining ring 12 to gearcase housing 10, prior to screwing ring 12 into lock ring 15 the outer surfaces of window retaining ring 12 including its front flange are evenly coated with a strong waterproof glue such as Devcon TM epoxy glue.

Thus window retaining ring 12 will be both threadedly mounted within the hole in the gearcase and also actually bonded to gearcase housing 10.

Window retaining ring 12 also contains an axially concentric groove into which is fitted O-ring 16 made of suitable resilient waterproof material. The groove preferably has an outside diameter of 0.875 inches.

A disc-shaped transparent sight glass 14 is inserted into the window receiving ring 12. Sight glass 14 has a diameter of 0.825 inches and a thickness of 0.187 inches so that one outer edge of the sight glass can be pressed against O-ring 16 positioned within the groove of window retaining ring 12.

Ring-shaped window cover 13 has external threads which are designed to screw into the interal threads in the front of window retaining ring 12 as best shown in FIG. 2. Window cover 13 has a flat annular inner face which is firmly pressed against the outer edge of sight glass 14 as window cover 13 is screwed down into window retaining ring 12 to provide a waterproof seal of sight glass 14 within window retaining ring 12.

A two-pin wrench is used to firmly position window cover 13 against sight glass 14 and to accomodate the twopin wrench (not shown) two holes 13a are bored along a diameter of the outer face of window cover 13 as shown in FIG. 3.

Various means may be employed to lock window cover 13 into place in window retaining ring 12. However, in this preferred embodiment a threaded hole is tapped into the adjoining edges of window retaining ring 12 and window cover 13 and a lock screw 17 as best shown in FIG. 2 is screwed into the threaded hole to maintain the two elements in a fixed position.

The foregoing preferred embodiment of my invention can also be mounted on the lower gearcase of an inboard marine engine which was manufactured without such a sight glass as well as on an outboard engine as shown in the drawings.

When my sight glass assembly is installed by the manufacturer of the marine engine at the time of manufacture, preferably the lower gearcase assembly is cast with a circular hole with a diameter of approximately 1.5 inches and with the thickness of the casting surrounding the hole being at least 0.370 inches rather than the coventional thickness of 0.130 inches of most lower gearcase housings. The added thickness will permit the hole in the casting to be threaded for a distance of about 0.370 inches to receive and support a window retaining ring similar to ring 15 previously described. Naturally, when the gearcase housing itself is threaded to receive the window retaining ring, the lock ring 15 of the preferred embodiment can be eliminated as an element of the sight glass assembly as previously described.

Use of my unique sight glass assembly on a marine engine, whether inboard or outboard and whether installed at the time of manufacture of subsequent thereto as described in the preferred embodiment, will substantially eliminate the damage caused to the marine engine by the entry of water into the lower gearcase, will reduce the cost of operation of marine engines and increase the enjoyment of owners of boats which employ marine engines.

While I have described and illustrated a preferred embodiment of my sight glass assembly and have described various modifications thereof, it should be understood that these descriptions are merely illustrative of my invention and are not restrictive, since the scope of my invention is limited only by the appended claims.

I claim:

1. A sight glass assembly adapted to be bonded into a circular hole in the lower gearcase of a marine engine comprising
    a window ring which is threadedly inserted into and bonded to the circular hole in the gearcase, said ring having an axially concentric groove,
    an O-ring of resilient waterproof material fitted into the annular groove in the window retaining ring,
    a disc-shaped transparent sight glass having a first one of two outer edges being pressed against the O-ring, and
    a ring-shaped window cover having a flat annular face firmly pressed against the second outer edge of the sight glass and threadedly joined to the window retaining ring.

2. A sight glass assembly as set forth in claim 1 wherein the window retaining ring is threadedly connected to an internally threaded lock ring located inside the gearcase and surrounding the circular hole in the gearcase.

3. A sight glass assembly as set forth in claim 1 wherein the window retaining ring is threadedly connected to the internally threaded circular hole in the gearcase itself.

4. A sight glass assembly as set forth in claim 1 wherein the threadedly joined window retaining ring and window cover are locked in place by a lock nut screwed into a threaded hole in the adjoining edges of the window retaining ring and the window cover.

* * * * *